United States Patent
Lahiri (10) Patent No.: US 7,209,557 B2
(45) Date of Patent: Apr. 24, 2007

(54) APPARATUS AND METHOD FOR COMPUTER SCREEN SECURITY

(75) Inventor: Sandip Lahiri, Tampa, FL (US)

(73) Assignee: Lenovo Singapore Pte, Ltd, Singapore (SG)

( * ) Notice: Subject to any disclaimer, the term of this patent is extended or adjusted under 35 U.S.C. 154(b) by 845 days.

(21) Appl. No.: 09/981,881

(22) Filed: Oct. 18, 2001

(65) Prior Publication Data

US 2003/0108198 A1    Jun. 12, 2003

(51) Int. Cl.
G09C 5/00    (2006.01)

(52) U.S. Cl. ...................................................... 380/54

(58) Field of Classification Search .................. 380/54, 380/56–58, 213, 210; 382/232, 233; 345/7, 345/8, 102; 713/182; 726/27–29
See application file for complete search history.

(56) References Cited

U.S. PATENT DOCUMENTS

| | | | | |
|---|---|---|---|---|
| 4,092,654 A | | 5/1978 | Alasia | 354/112 |
| 4,972,476 A | | 11/1990 | Nathans | 380/23 |
| 5,161,188 A | | 11/1992 | Pires | 380/15 |
| 5,629,984 A | * | 5/1997 | McManis | 380/54 |
| 5,715,316 A | * | 2/1998 | Steenblik et al. | 380/54 |
| 5,841,863 A | | 11/1998 | Ryan et al. | 380/11 |
| 5,863,075 A | | 1/1999 | Rich et al. | 283/94 |
| 6,002,794 A | * | 12/1999 | Bonneau et al. | 382/166 |
| 2002/0015008 A1 | * | 2/2002 | Kishida et al. | 345/7 |
| 2002/0061140 A1 | * | 5/2002 | Kajiwara | 382/233 |
| 2002/0101988 A1 | * | 8/2002 | Jones | 380/54 |

FOREIGN PATENT DOCUMENTS

DE    10141347    * 3/2003

OTHER PUBLICATIONS

Microsoft Computer Dictionary Fourth Edition p. 167.*

* cited by examiner

*Primary Examiner*—Hosuk Song
*Assistant Examiner*—Patel Nirav
(74) *Attorney, Agent, or Firm*—Gordon & Rees LLP; Carlos Munoz-Bustamante (57) ABSTRACT

A combination of software and hardware renders the computer screen incomprehensible to onlookers. The software consists of a computer program that scrambles the organization of the image on the computer screen. The hardware consists of a set of glasses that reorganizes the scrambled image on the computer screen so that the authorized user can comprehend the image. In an alternate embodiment, the scrambled image is transmitted by cable or wireless transmission to a set of display glasses with an embedded personal display computer that unscrambles the image for viewing at the display glasses.

19 Claims, 7 Drawing Sheets

| 512 | 514 | 516 |
|---|---|---|
| 518 | 520 | 522 |
| 524 | 526 | 528 |

| 552 | 554 | 556 |
|---|---|---|
| 558 | 560 | 562 |
| 564 | 566 | 568 |

APPARATUS AND METHOD FOR COMPUTER SCREEN SECURITY

BACKGROUND

Field of the Invention

The present invention is directed to an apparatus and method of preventing unauthorized users from viewing a computer screen.

The use of laptop computers in public spaces such as airports, airplanes, and hotel lobbies raises security implications regarding unauthorized viewing by individuals who may be able to see the screen. Additionally, tracking the release of sensitive information can be difficult since unauthorized viewers do not get direct access to the information through a computer and thus do not leave a digital fingerprint from which they could later be identified. Thus, a need exists for an apparatus and method for providing security on computer screens.

Video and image scrambling is a common topic in the prior art (See e.g. U.S. Pat. No. 5,841,863 and U.S. Pat. No. 5,161,188). However, the prior art focuses on the need for scrambling video images at a source, transmitting the scrambled image over various means, and then unscrambling the image at the destination. This method of scrambling and unscrambling is useful for data transmission; however it does not prevent an unauthorized user from viewing the unscrambled image at the destination. What is needed beyond the prior art is an apparatus and method for scrambling a computer screen that will allow the image to be viewed by the authorized user, but will render the computer screen unreadable to unauthorized users.

U.S. Pat. No. 5,863,075 (Rich) discloses an apparatus and method for scrambling and unscrambling images using a plurality of scrambling and unscrambling screens. The intended image is printed on one screen and can be combined with a seemingly random assortment of other lines and shapes. An unscrambling screen is used to filter out the additional lines and shapes so that the combination of the screens reveals the intended image. However, Rich is limited in that the unscrambling screen must be placed directly upon the scrambled image to view the image. In addition, once the image is unscrambled, the image can be viewed by anyone within the vicinity of the image. What is needed beyond Rich is an apparatus and method for scrambling and unscrambling images in which only the intended viewer is ale to view the image.

Therefore, a need exists for an apparatus and a method of preventing casual onlookers from obtaining information on a computer screen. A need also exists for an apparatus and a method of providing additional security for computers by encrypting the computer screen in a way that it is only viewable by a single individual.

SUMMARY OF THE INVENTION

The present invention meets the needs stated above by utilizing a combination of software and hardware that renders the computer screen incomprehensible to onlookers. The software consists of a computer program that scrambles the organization of the image on the computer screen. The scrambling program can start automatically during the computer boot up and the computer display will only show the scrambled information. The hardware consists of a set of glasses that reorganizes the scrambled image on the computer screen so that the authorized user can comprehend the image. The glasses contain lenses consisting of a unique arrangement of smaller square lenses tiled together to form a full size eyeglass lens. The smaller lenses correspond to the break-up pattern used by the software to scramble the computer screen. When the invention is utilized, the screen is incomprehensible to the normal viewer. However, a viewer equipped with the correct glasses will see the unscrambled image. Another feature of the present invention occurs when the computer is stolen by an unauthorized person who does not have access to the appropriate glasses. In this case, an attempt to view the information on the computer by the unauthorized user would be unsuccessful because the display image is scrambled at the software level. In an alternate embodiment, the scrambled image is transmitted by cable or wireless transmission to a set of display glasses with an embedded personal display computer that unscrambles the image for viewing at the display glasses.

DESCRIPTION OF PREFERRED EMBODIMENT

Figure 1:
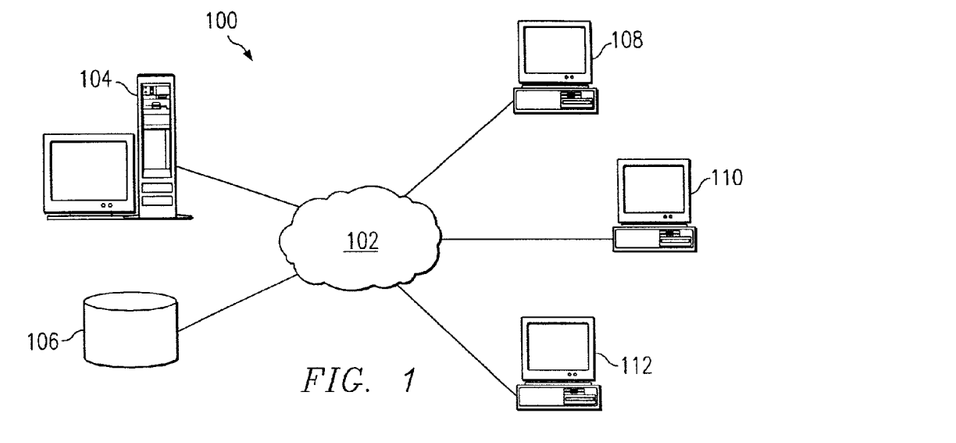
FIG. 1 is a depiction of a distributed data processing system.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
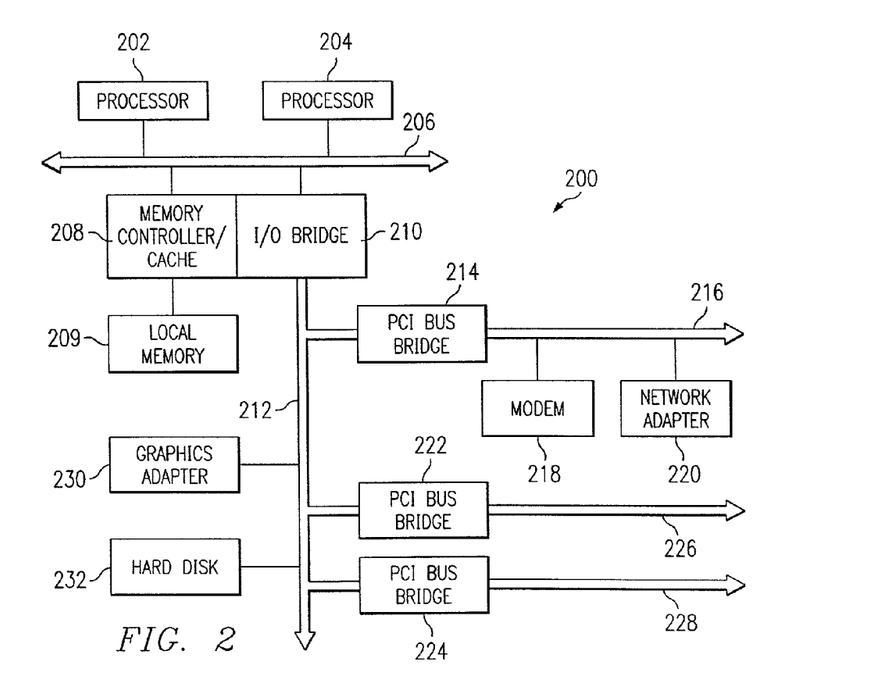
FIG. 2 is a depiction of a server computer.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI bus local 216. Typical PCI bus implementations will support four PCI expansion slots or add-in connectors. Communications links to network computers 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
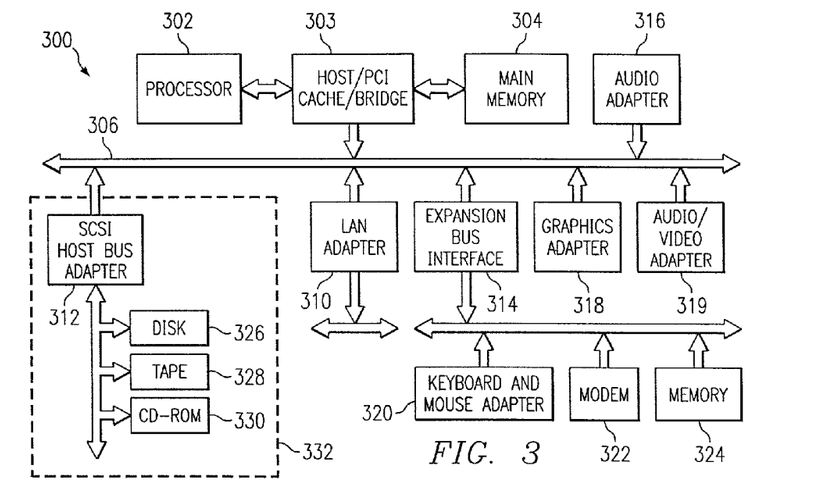
FIG. 3 is a depiction of a client computer.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324, SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operations system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device that is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functional data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disk, a hard disk drive, a RAM, and CD-ROMs, and transmission-type media, such as digital and analog communications links.

Figure 4A:
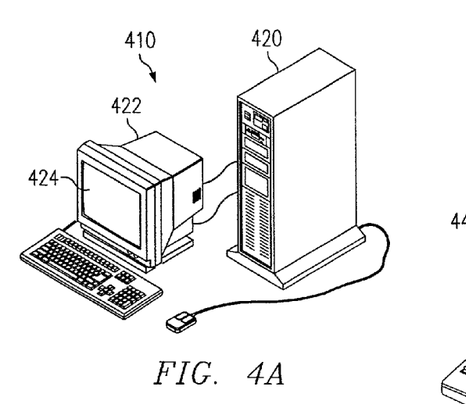
FIG. 4A is a depiction of a desktop computer with external display screen.

FIG. 4A is a depiction of desktop computer 410 having a main computer 420 and a display unit 422. Display unit 422 has display screen 424.

Figure 4B:
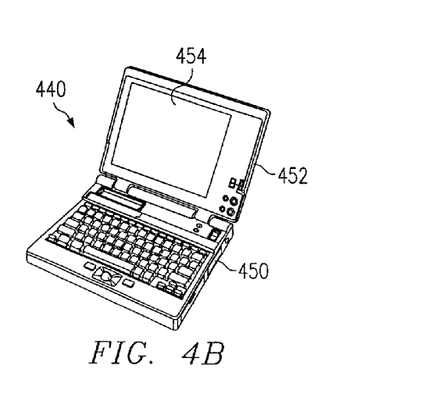
FIG. 4B is a depiction of a laptop computer with built-in display screen.

FIG. 4B is a depiction of laptop computer 440 having a computer section 450 and display section 452. Display section 452 has laptop display screen 454.

Figure 5A:
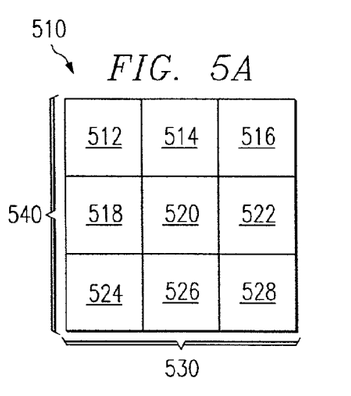
FIG. 5A is a depiction of N×M array on a computer screen where N-3 and M=3.

FIG. 5A depicts computer screen N×M array (CSA) 510 where N is the number of horizontal screen segments and M is the number of vertical screen segments. In CSA 510, N–3 because there are three screen segments in horizontal direction 530 and M–3 because there are three screen segments in vertical direction 540. As used herein a screen segment (CS) is a segment of an image on a computer screen that has sides of equal length. Screen segments can be "tiled" together to form a square or rectangle depending on the values assigned to N and M. As used herein "tiling" means that each segment is adjacent to each segment with which it has a common side so that there are no spaces between segments and an unbroken image can appear on the display screen. In the example of CSA 510, where N–3 and M=3 there are nine screen segments identified as follows, top left CS 512, top center CS 514, top right CS 516, left center CS 518, center CS 520, left center 522, left bottom CS 524, bottom center 526, and right bottom CS 528.

Figure 5B:
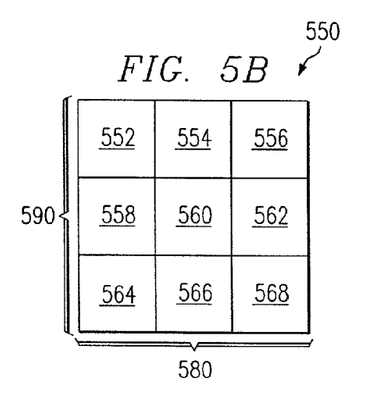
FIG. 5B is a depiction of an N×M array of convex lenses for eyeglasses where N=3 and M=3.
Figure 5C:
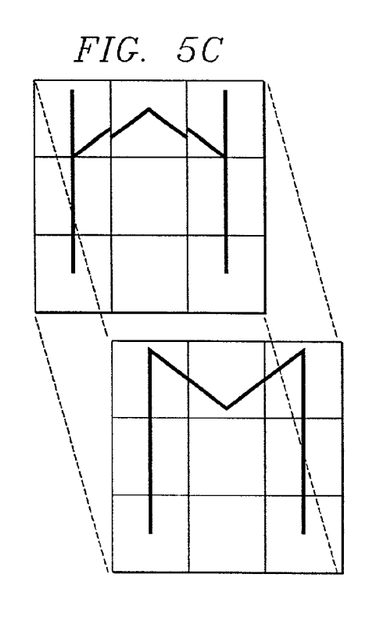
FIG. 5C is a depiction of a first scrambled image on an 3×3 array on a computer screen and the corresponding descrambled image seen through an E×E array of convex lenses.
Figure 5D:
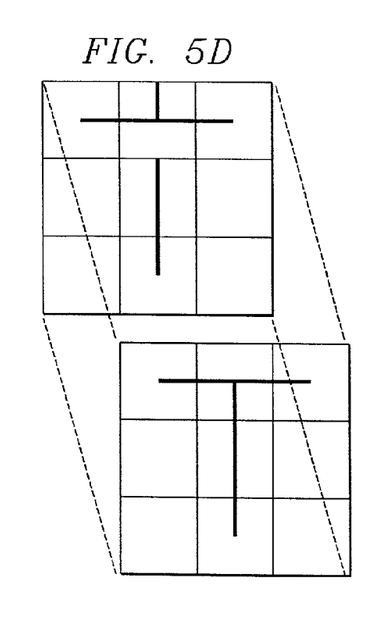
FIG. 5D is a depiction of a second scrambled image on an 3×3 array on a computer screen and a the corresponding descrambled image seen through a 3×3 array of convex lenses.

FIG. 5B depicts lens N×M array (LA) 550 where N is the number of horizontal lens units and M is the number of vertical lens units. In LA 550, N=3 because there are three lens units in horizontal direction 580 and M=3 because there are three lens units in vertical direction 590. As used herein, a lens unit means a convex lens that has sides of equal length. As used herein, a lens array means a group of lens units that have been tiled together to form a square or rectangle depending on the values assigned to N and M. As used herein "tiling" means that each lens unit is adjacent to each lens unit with which it has a common side so that there are no spaces between segments and an unbroken image can be seen through the LA. In the example of LA 550, where N=3 and M=3 there are nine lens units identified as follows, top left LA 552, top center LA 554, top right LA 556, left center LA 558, center LA 560, left center LA 562, left bottom LA 564, bottom center LA 566, and right bottom LA 568.

Figure 6:
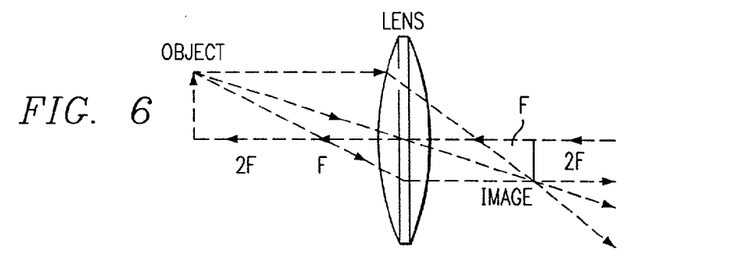
FIG. 6 is a diagram of the image inversion caused by a convex lens.

LA 550 is used in conjunction with CSA 510. FIG. 6 depicts a convex lens and shows the image inversion achieved by a convex lens. The object in FIG. 6, when viewed through the lens is seen completely inverted. The principal axis of a double convex lens is defined as the horizontal axis of the lens across which the lens is symmetrical. Light rays incident towards either face of the lens and traveling parallel to the principal axis will converge, in case of a double convex lens, to point known as the focal point of the lens. The focal point is denoted by the letter F in FIG. 6. Each lens has two focal points—one on each side of the lens. Every lens has two possible focal points. The image of an object when viewed through a thin double convex lens will appear inverted as shown in FIG. 6. Thus, if the object was inverted originally, when viewed through the thin double convex lens, the image will appear upright. The principle depicted in FIG. 6 will be employed in conjunction with CSA 510 and LA 550 to scramble the image displayed on a computer screen and then to unscramble the image when viewed through LA 550. Scrambling is achieved by dividing a computer screen image into segments and then inverting each of the screen segments. The screen may be viewed unscrambled by viewing the screen through lens array 550.

Figure 7:
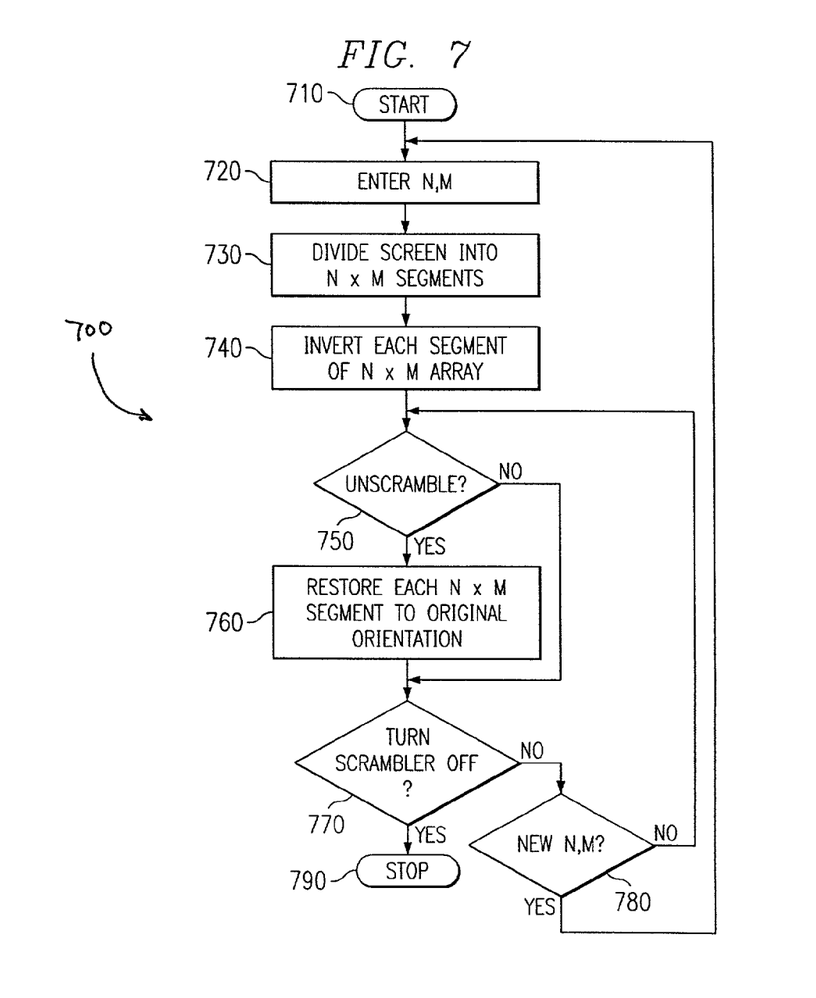
FIG. 7 is a flow chart for the image scrambling process.

FIG. 7 is a depiction of scrambling program (SP) 700 that operates within memory 304 of computer 300. The scrambling program starts (710) and queries the user to enter values for N and M (720). Next, the image that is normally displayed on the computer screen is divided into segments (730). In the preferred embodiment, the segments are squares, which can be tiled together to form the image. However, those skilled in the art of computer programming will appreciate that other types of segments can be formed out of other geometric shapes such as triangles and hexagons.

The screen is divided into N×M segments (730). Each of the screen segments is inverted (740) so that when viewed through a lens array of corresponding N×M configuration, the images will be seen in their original orientation. While lens units are tiled together in LA 550, the unscrambled image is formed on the user's side of LA 550. In this manner, only the user who wears the glasses is able to view a comprehendible image of the computer screen. To all other users, the computer screen appears to be a garbled compilation of individual images.

In the preferred embodiment, inversion of screen segments is used. Additional method of scrambling that may be used are reflection (making the segment image appear backwards), shrinking (making the image appear smaller than its normal size), and rotation (rotating the image about a central point). Those skilled in the arts of computer programming and optics will be aware of the various methods in which a computer screen image can be distorted so that a specific optical lens array can correct the distortion. The arrangement of the distorted segments is such that the compilation of the individual distorted segments is sufficiently different from the original image and prevents unauthorized users from comprehending the image. A determination is made as to whether the user wants to unscramble the image (750). If the user chooses to unscramble the image, then each N×M screen segment is returned to its original orientation and the unscrambled image will be visible on the computer display screen (750). If the user does not want to unscramble the image, or after the screen segments have been returned to their original orientation, a determination is made as to whether the scrambler is to be turned off (770). If the user does not want to turn the scrambler off, then a determination is made whether the user wants to enter new values for N and M to change the configuration of screen segments (780). If the user does not want to enter new values for N and M, then the scrambling program will go to step 750. If the user does want to enter new values for N and M, then the scrambling program will go to step 720. If the user wants to turn the scrambler off, the program will stop (790).

The tiling of lens units within lens array 550 creates a very high number of possible scrambling combinations. The possible combinations are so numerous that it is unlikely that an unauthorized individual will have the exact same pair of glasses as the authorized user.

Figure 8A:
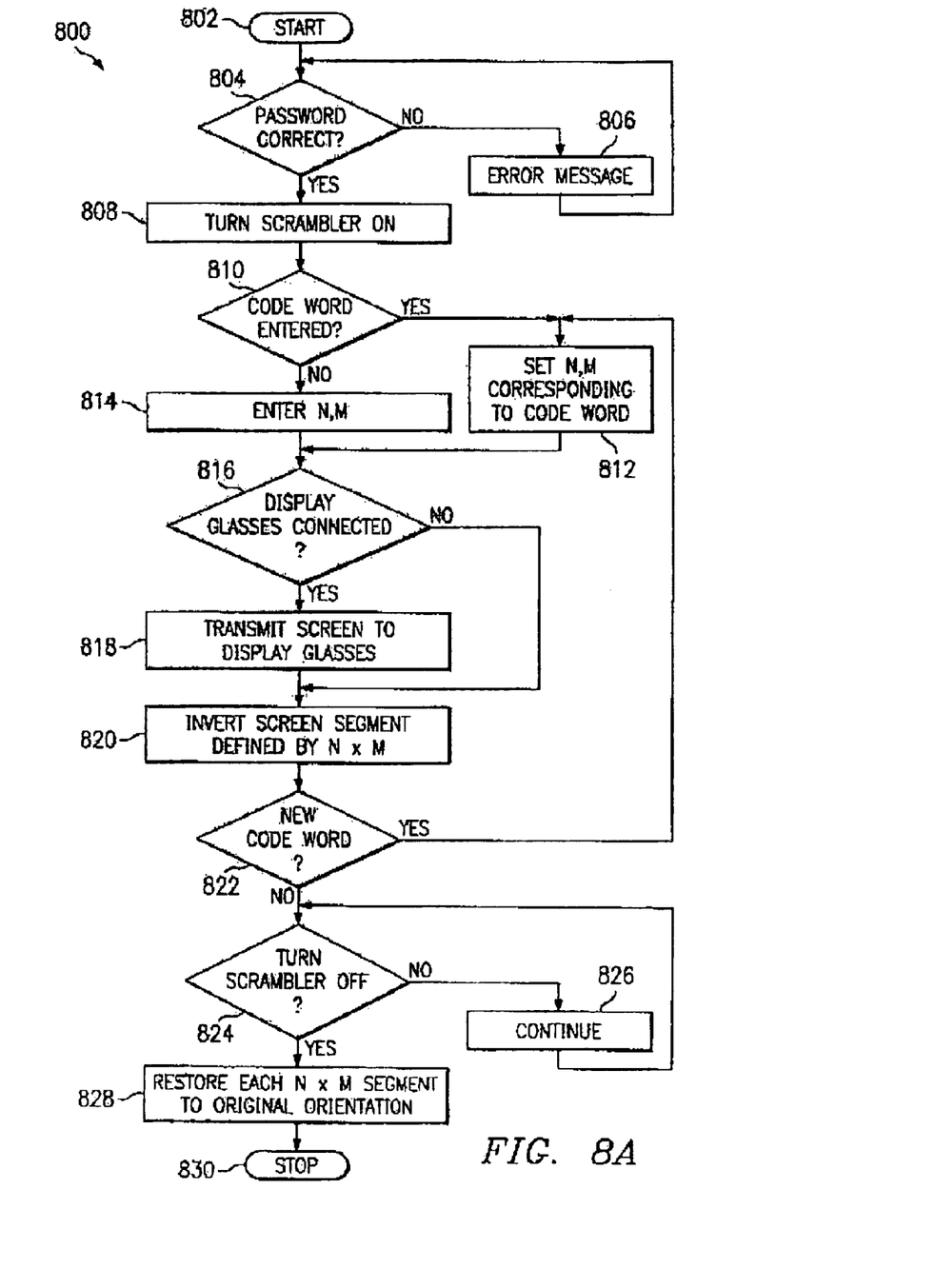
FIG. 8A is a flow chart of the image scrambling process when used with codewords and display glasses.

FIG. 8A depicts augmented scrambling program (ASP) 800 having three additional security features: a password, a code word, and display glasses. As used herein, the term password means any combination of characters used to access the ASP 800. As used herein, the term codeword means any combination of characters, other than the combination of characters in the password, used to identify a particular set of values for N and M. As used herein, the term display glasses means a set of glasses that displays the computer screen image transmitted by cable or wireless technology from a computer, containing a personal display computer to unscramble a transmitted computer screen image, and so constructed that only the person wearing the glasses can see the transmitted computer screen image. Display glasses are discussed further in FIGS. 8B and 8C. The ASP 800 begins (802). A determination is made whether a correct password has been entered (804). If a correct password had not been entered, then the augmented scrambling program displays an error message (806) and returns to step 804. If a correct password has been entered, the scrambled program is activated (808). Next, a determination is made as to whether a code word has been entered. If a code word is entered, then the program sets N and M corresponding to the values for that particular codeword (812). If a code word has not been entered, then the scrambling program queries the user to enter N and M. A determination is made whether display glasses are connected. If display glasses are connected, the computer screen image is transmitted to the display glasses (818) and ASP 800 proceeds to step 820. If the display glasses are not connected, then ASP 800 proceeds to divide the screen segments into N×M segments and each screen segment is inverted (820). As will be further discussed below, when using display glasses for viewing the screen segments, a greater variety of scrambling techniques can be used. In the preferred embodiment, inversion of screen segments is used. As noted with SP 700, additional methods of scrambling that may be used are reflection (making the segment image appear backwards), shrinking (making the image appear smaller than its normal size), and rotation (rotating the image about a central point). However, when using display glasses, the method of scrambling is only limited by the operations performed on each of the N×M screen segments. A determination is made as to whether a new code word has been entered (822). If a new code word has been entered, then the scrambling program goes to step 812. If a new code word has not been entered, then a determination is made as to whether the scrambler has been turned off (824). If the scrambler has not been turned off, then the program continues (826) and returns to step 824. If the scrambler has been turned off, then each N×M segment is returned to its original orientation (828) and the scrambling program stops (830).

Figure 8B:
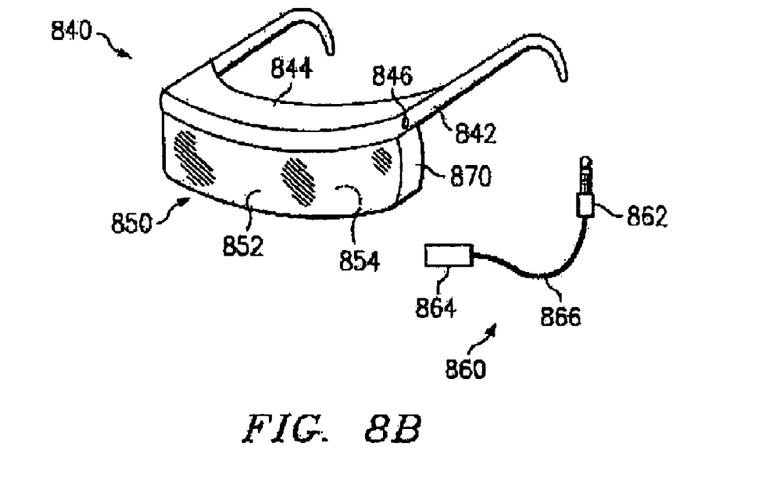
FIG. 8B is a depiction of the display glasses and connecting cable configuration.

FIG. 8B depicts display glasses 840 having frame 842, top 844, personal display screen 850, and personal display computer 870. Personal display screen 850 has inside surface 854 and outside surface 852. Outside surface 852 is opaque. Top 844 keeps light from interfering with viewing of images on inside surface 854. In the preferred embodiment, inside surface 854 is a liquid crystal display (LCD). However, inside surface 854 is not limited to an LCD display and inside surface 854 may use any suitable type of display technology known to persons skilled in the art. Frame 842 secures display glasses 840 to the head of the user. Personal display screen 850 has personal display computer 870 embedded so that personal display screen 850 and personal display computer are of unitary external construction. In an alternate embodiment, personal display computer may be externally attached to either top 844, frame 842 or personal display screen 850 and electrically connected to personal display screen 850. Connecting cable 860 has display glasses connector 862 connected to computer connector 864 by cable 866. Frame 842 has connecting port 846 for receiving display glasses connector 862. Computer connector 864 may be any suitable connector known to a person skilled in the art. Display glasses 840 may be connected to a computer by either connecting cable 860 or by a wireless connection such as bluetooth technology.

Figure 8C:
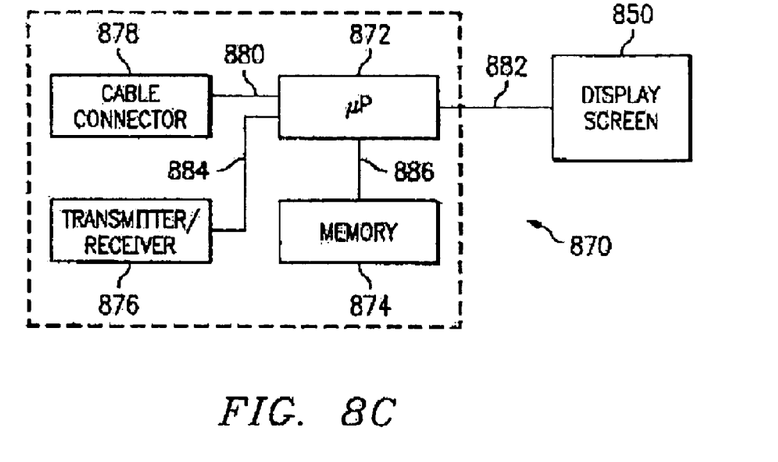
FIG. 8C is a schematic of the personal display computer.

FIG. 8C depicts personal display computer (PDC) 870 having PDC microprocessor 872, PDC memory 874, PDC transmitter/receiver 876 and PDC cable connector 878. PDC memory 874 is connected to PDC microprocessor 872 by first line 886. PDC cable connector 878 is connected to PDC microprocessor 872 by second line 880. PDC transmitter/receiver is connected to PDC microprocessor 872 by third line 884. PDC microprocessor 872 is connected to personal display screen 850 by fourth line 882. In the preferred embodiment, PDC transmitter/receiver 876 uses bluetooth technology to electronically connect display glasses 840 to a computer having either SP 700 or ASP 800 in memory. In addition, server 104 (FIG. 2), data processing system 300 (FIG. 3), desktop computer 410 (FIG. 4A) and laptop computer 440 (FIG. 4B) may all be provided with bluetooth technology or other suitable transmitting/receiving technology known to those skilled in the art for use with display glasses 840.

Figure 9:
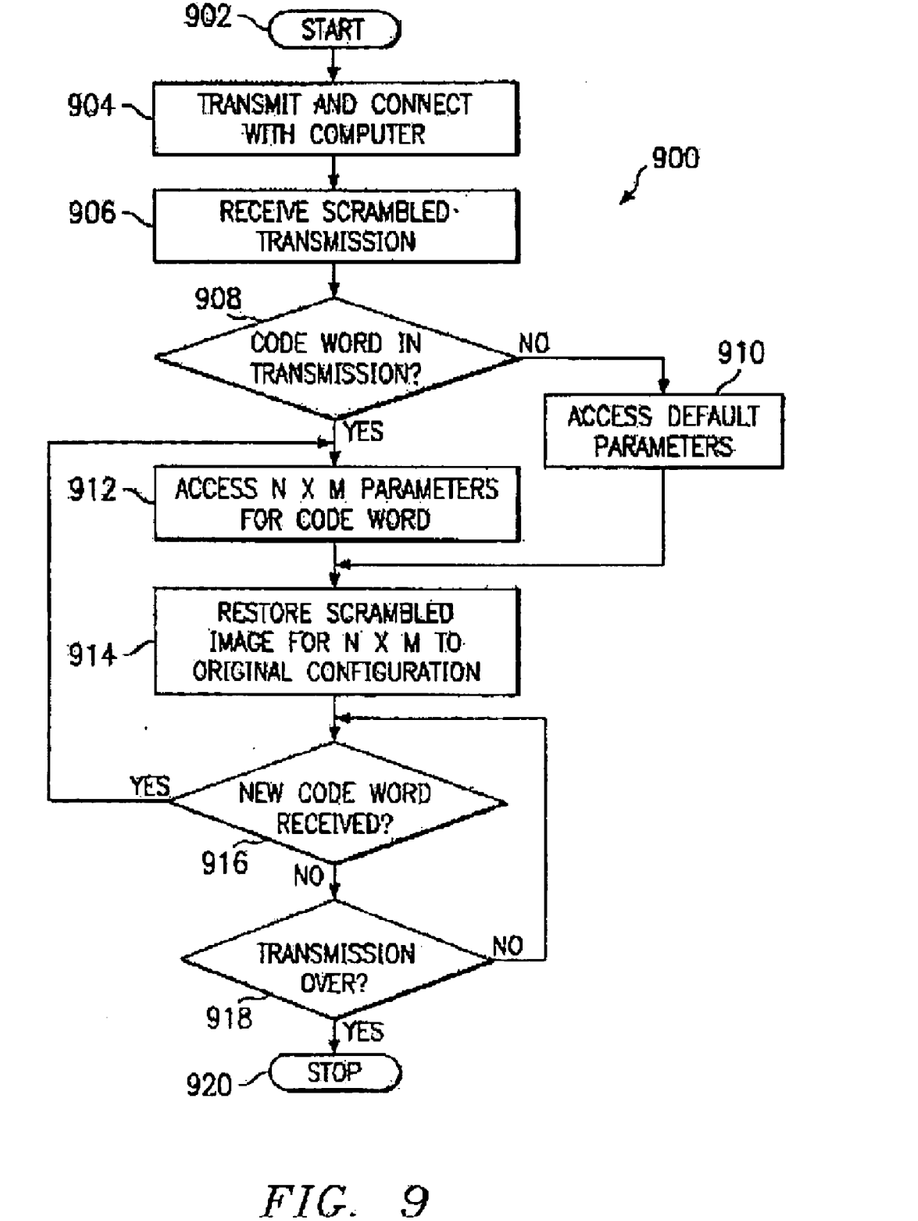
FIG. 9 is a flow chart of the personal display computer program.

FIG. 9 depicts a flow chart for personal display computer program (PDCP) 900. PDCP 900 is placed in memory 874 of PDC 870. PDCP 900 starts when display glasses 840 are connected to an external computer, having ASP 800 in the memory of that computer, by either connecting cable 860 or transmission from the computer to PDC transmitter/receiver 876. PDCP 900 transmits and connects with the external computer (904). PDCP 900 receives a transmission from the external computer containing an N×M array of scrambled screen segments (906). PDCP 900 determines whether a code word is contained in the transmission (908). If a code word is not contained in the transmission, then PDCP 900 accesses the N×M default parameters (910) in PDC memory 874. If a code word is contained in the transmission, then PDCP accesses the N×M parameters stored in PDC memory 874 for that codeword (912). PDCP 900 then restores the scrambled images for the N×M array of image segments to their original configuration (914) so that the viewer using personal display glasses 840 will view the image in its unscrambled form. PDCP 900 determines whether a new code word has been received (916). If a new codeword has been received, then PDCP 900 goes to step 912. If a new codeword has not been received, then PDCP 900 determines whether the transmission is over (918). If the transmission is not over, then PDCP goes to step 916. If the transmission is over, then PDCP ends (920).

It will be understood from the foregoing that various modifications and changes may be made in the preferred embodiment of the present invention by those skilled in the art without departing from its true spirit. It is intended that this description is for purposes of illustration only and should not be construed in a limiting sense. The scope of the invention should be limited only by the language of the following claims.

What is claimed is:

1. A method of providing computer screen security for an authorized user comprising:

using a computer program in a computer having a computer screen, creating a scrambled image of an original image by dividing the original image on the computer screen into an array of screen segments; and changing the orientation of each of the screen segments so that the original image can only be read by the authorized user viewing at a personal display screen electronically connected to a personal display computer;

wherein the computer and personal display computer are adapted for electronic communication so that the computer program causes the computer to electronically transmit the scrambled image and a parameter to the personal display computer;

wherein the personal display computer uses the parameter to orient each of the screen segments and displays an unscrambled image on the personal display screen so that a user can view the original image on the personal display screen;

wherein the original image is not visible at the computer screen; and wherein the personal display computer and personal display screen are contained in a set of display glasses.

2. The method of claim 1 wherein the step of changing the orientation of each of the screen segments is performed by inversion.

3. The method of claim 1 wherein the step of changing the orientation of each of the screen segments is performed by rotation.

4. The method of claim 1 wherein the step of changing the orientation of each of the screen segments is performed by shrinking.

5. The method of claim 1 wherein a personal display computer program in a memory of the personal display computer determines whether a codeword has been received.

6. The method of claim 5 wherein responsive to a determination that a codeword has been received, the personal display computer program accesses a set parameter from a personal display computer memory.

7. The method of claim 6 wherein responsive to accessing a parameter from the personal display computer memory, a microprocessor in the personal display computer causes the orientation of each of the screen segments to be changed so that the image can be read by viewing at the personal display screen.

8. A method of providing security for a computer screen comprising:
   using a program in a computer, causing the computer to divide an image into an array of screen segments on the computer screen; and
   change the orientation of each of the screen segments to create a scrambled image so that the scrambled image can be read only by a person wearing a set of display glasses and so that the computer screen is incomprehensible to a viewer other than the person wearing the set of display glasses;
   electronically transmitting the scrambled image to a personal display computer located in the set of display glasses;
   electronically transmitting a codeword to the personal display computer;
   responsive to receipt of the codeword by the personal display computer, accessing a parameter from a personal display computer memory; and
   wherein the personal display computer uses the parameter to reorganize the scrambled image so that the person wearing the set of display glasses can comprehend the image in an unscrambled form on a display screen of the display glasses.

9. An apparatus for providing computer screen security comprising:
   a programmable processor;
   a storage medium;
   a program residing in the storage medium;
      wherein the program causes the processor to:
      divide an image into an array of screen segments on a computer screen; and
      create a scrambled image by changing the orientation of each of the screen segments so that the scrambled image can be read only by viewing through an array of lens units that reorganize the scrambled image after electronic transmission to a personal display computer connected to an array of lens units;
      electronically transmit the scrambled image to the personal display computer;
      electronically transmit a codeword to the personal display computer; and
      wherein the personal display computer uses the codeword to configure the array of lens units to reorganize the scrambled image so that an unscrambled image can be viewed on a personal display screen in a set of display glasses.

10. An apparatus for providing computer screen security comprising:
   a computer having a programmable processor connected to a storage medium;
   a scrambling program residing in the storage medium;
      wherein the scrambling program causes the programmable processor to:
      divide an image into a plurality of screen segments and change the orientation of each of the plurality of screen segments so that the image is scrambled;
      electronically transmitting a scrambled image to a personal display computer;
      wherein the personal display computer unscrambled the scrambled image so that the original image is displayed on a personal display screen connected to the personal display computer; and
      wherein the personal display screen has a frame adapted for wear by a user in the manner of glasses.

11. The apparatus of claim 10 wherein the personal display computer further comprises a processor and a personal display computer memory containing a computer program and a plurality of parameters corresponding to a plurality of codewords so that upon receipt of a codeword by the personal display computer program, a parameter corresponding to the codeword can be retrieved from the memory and used by the processor to change the orientation of each of the screen segments.

12. The apparatus of claim 10 wherein the personal display computer further comprises a personal display computer transmitter/receiver.

13. The apparatus of claim 12 wherein the personal display computer transmitter/receiver uses a bluetooth technology.

14. The apparatus of claim 12 wherein the personal display computer transmitter/receiver uses a conventional wireless technology.

15. The apparatus of claim 10 wherein the display glasses further comprise a personal display screen and a personal display computer.

16. The apparatus of claim 11 wherein the personal display computer memory further comprises a plurality of code words corresponding to a plurality of parameters.

17. The apparatus of claim 10 wherein the scrambling program inverts each of the plurality of screen segments.

18. The apparatus of claim 10 wherein the scrambling program rotates each of the plurality of screen segments.

19. The apparatus of claim 10 wherein the scrambling program is shrinks each of the plurality of screen segments.

* * * * *